United States Patent [19]
Ramsey et al.

[11] Patent Number: 5,333,488
[45] Date of Patent: Aug. 2, 1994

[54] GAUGING SYSTEM WITH IMPROVED SETUP AND OPERATING METHOD

[75] Inventors: Charles R. Ramsey, Dunkirk; Russell E. Holcomb; Brian L. Backus, both of Muncie, all of Ind.

[73] Assignee: Matrix Technologies, Inc., Muncie, Ind.

[21] Appl. No.: 869,620

[22] Filed: Apr. 16, 1992

Related U.S. Application Data

[63] Continuation-in-part of Ser. No. 487,954, Apr. 9, 1990, abandoned, which is a continuation of Ser. No. 727,329, Jul. 3, 1991, Pat. No. 5,213,726.

[51] Int. Cl.$^5$ .............................................. F15B 5/00
[52] U.S. Cl. ......................................... 73/1 J; 73/4 R
[58] Field of Search ................... 73/1 J, 37.5–37.8, 73/4 R; 425/171; 251/318, 330, 333, 215, 218, 284

[56] References Cited

U.S. PATENT DOCUMENTS

| | | | |
|---|---|---|---|
| 1,985,576 | 12/1934 | Mennesson | 33/174 |
| 2,374,690 | 5/1945 | Lave | 251/284 |
| 2,755,816 | 7/1956 | Colling | 251/333 |
| 3,123,337 | 3/1964 | Peras | 251/333 |
| 3,255,774 | 6/1966 | Gallagher et al. | 251/333 |
| 3,266,309 | 8/1966 | Fishman et al. | 73/205 |
| 3,277,914 | 11/1966 | Manion | 137/81.5 |
| 3,467,122 | 9/1969 | Jones | 137/81.5 |
| 3,507,212 | 4/1970 | Matteson | 100/53 |
| 3,543,779 | 12/1970 | Eckevlin et al. | 137/81.5 |
| 3,632,251 | 1/1972 | Henry | 425/166 |
| 3,677,680 | 7/1972 | Etherington | 425/129 |
| 3,942,928 | 3/1976 | Kelz | 425/138 |
| 4,059,130 | 11/1977 | Cohen | 73/37.5 |
| 4,081,225 | 3/1978 | Yaita | 251/333 |
| 4,131,596 | 12/1978 | Allen | 264/40.5 |
| 4,185,807 | 1/1980 | Milliren | 251/218 |
| 4,473,345 | 9/1984 | McDowell | 425/137 |
| 4,531,901 | 7/1985 | Anderson | 425/150 |
| 4,580,965 | 4/1986 | Wernecke | 425/145 |
| 4,696,632 | 9/1987 | Inaba | 425/150 |
| 4,734,869 | 3/1988 | Mickowski | 364/550 |

FOREIGN PATENT DOCUMENTS

| | | | |
|---|---|---|---|
| 130233 | 4/1947 | Australia | 251/284 |
| 60-79772 | 4/1985 | Japan | |

(List continued on next page.)

OTHER PUBLICATIONS

S. A. Ginsberg, et al., The Fundamentals of Automatics and Telemechanics, Moscow, the "Energy" Publishers, 1968, p. 364 (Translated in part).

(List continued on next page.)

*Primary Examiner*—Robert Raevis
*Attorney, Agent, or Firm*—Willian Brinks Hofer Gilson & Lione

[57] ABSTRACT

A gauging system includes a source of pressurized fluid, one or more fluid outlet means, each including a fluid line connecting the source of pressurized fluid with a fluid orifice that is located to measure small gaps and distances between the elements of a machine or die, and one or more pressure transducers connected to measure the pressure in each fluid line. One or more adjustable valves are provided between the source of pressurized fluid and each fluid line. A computer measures the transducer output to determine the distance between mold elements. The valve or valves include a threaded male member having an inlet at one end and a frusto-conical surface with openings passing through it at the other, and a threaded female member having a channel in one end and an outlet in the other joined by another frustoconical surface. The male member may be screwed into the channel of the female member to control the distance between the two frustoconical surfaces and thus the fluid flow from the inlet to the outlet through the openings. The system is calibrated by measuring the transducer output for a set of distances including the open mold distance, with an essentially infinite hose length. When the system is set up at the customer's location, with the shorter length of hose, the system is brought back into calibration by opening the mold and adjusting the valve until the transducer output is within specification for the mold open calibration point.

23 Claims, 9 Drawing Sheets

FOREIGN PATENT DOCUMENTS

| | | |
|---|---|---|
| 332322 | 7/1970 | U.S.S.R. . |
| 357470 | 10/1970 | U.S.S.R. . |
| 896406 | 4/1980 | U.S.S.R. . |
| 1041207 | 6/1982 | U.S.S.R. . |
| 1105277 | 6/1982 | U.S.S.R. . |
| 1468649 | 8/1987 | U.S.S.R. . |

OTHER PUBLICATIONS

A. V. Vysotsky et al., Design and Adjustment of Pnuematic Devices for Linear Measurements, Moscow, Mashinostrogenie Publishers, 1972, pp. 16–17 (Translated in Part).

O. B. Balakshin, Automation of Pneumatic Control of Dimensions in Machine Building, Moscow, Machinostrogenie Publishers, 1964, pp. 125–126.

GAUGING SYSTEM WITH IMPROVED SETUP AND OPERATING METHOD

This is a continuation-in-part of PCT/US88/03561 filed Oct. 13, 1988, now abandoned as U.S. patent application Ser. No. 07/487,954 filed Apr. 9, 1990 which was continued as U.S. patent application Ser. No. 07/727,329, filed on Jul. 3, 1991, issued as U.S. Pat. No. 5,213,726 on May 25, 1993.

FIELD OF THE INVENTION

The invention in general relates to systems that include gauging apparatus to sense distances between machine elements due, for example, to irregularities in machine operation, and, in particular, relates to such a system that can be calibrated at the factory and set up at the operating location with only simple adjustments.

BACKGROUND OF THE INVENTION

U.S. Pat. No. 4,824,351 discloses a gauging system that employs flowing pressurized gas to sense distances between the elements of a machine and is particularly useful in molding and die casting systems to measure the distances due to the malfunctioning, misalignment and warping of the die elements, and other irregularities in the system. U.S. Pat. No. 4,824,351 discloses molding and gauging systems including, for example, a pair of machine element surfaces, one of which is movable, a source of controlled pressurized air, one or more air outlet orifices in one of the machine element surfaces, fluid lines connecting the source of pressurized air and each of the air outlets, a transducer coupled to each of the fluid lines for monitoring the pressure in each line and providing an output signal indicative of the distance between the machine element surfaces, and a data-processing means coupled to each of the transducers to calibrate the system, to calculate the distance between the machine surfaces, to provide an alarm if the measurements indicate a system irregularity and to provide a permanent record of the measurements. PCT/US88/03561 (published with WIPO No. WO89/03292) discloses improvements of the above system, including more sophisticated data processing and calibration of the system.

The systems described in the above-referenced documents are quite useful in providing information about the operation of machines and the distances of their elements during their operation; however, the measurement from each of the air outlets is somewhat dependent upon the length of the fluid line between the air orifice and the transducer. This presents a problem because, for maximum accuracy, either standard lengths of fluid line must be used during factory calibration and at the customer's location, or calibration must be performed for each of the different lengths of fluid lines used. Since the distances between the pressurized air source and the air outlet orifices can vary widely in applying such systems to operating industrial machinery, a standard line length must be one that is long enough for all possible pressure-source-to-orifice distances, which results in an excessive amount of fluid line cluttering the area about the industrial operation, which can get caught in the machinery and be damaged. If appropriate lengths of line are used to just span the distance between the pressure source and air orifices, then each time a gauging system is moved from one machine to another, the system must be recalibrated over its range of measurement for each different length of hose if maximum accuracy is desired. Thus, it would be highly desirable to have a system that could be calibrated quickly and easily when installed on different machines or used with different molds and dies, and one in which a simple adjustment could be made to account for differing lengths of fluid line that is used.

It would also be desirable to have a valve that provides little restriction to fluid flow and can precisely vary and control fluid flow at high flow rates for use in systems like those described above and others. U.S. Pat. No. 4,673,160 issued to Patrick Tolley, U.S. Pat. No. 4,593,881 issued to Hozo Yoshino and U.S. Pat. No. 4,099,700 issued to Wen Young are typical of various approaches to fluid valves that are intended to provide precise control of flow. Each of these valves either restricts the flow channel considerably, as in U.S. Pat. No. 4,099,700, or forces the fluid to substantially alter its direction of flow, as in U.S. Pat. Nos. 4,673,160 and 4,593,881, both of which also add significant restriction, and possible variability, to the flow in controlling it. It is believed that such valves could not be used in adjusting the gauging systems described above to provide an easily and quickly calibrated system and might introduce variabilities in addition to those resulting from the variable length of fluid line.

SUMMARY OF THE INVENTION

It is the object of the invention to provide a gauging system that overcomes one or more of the disadvantages of prior art gauging systems.

It is a further object to provide a gauging system that can be accurately calibrated at the factory and then easily adjusted at an operating location for varying lengths of fluid line that are used.

It is another object of the invention to provide one or more of the above objects in a molding and gauging system which is more accurate no matter what lengths of fluid lines are used.

It is yet another object of the invention to provide a molding and gauging system which provides one or more of the above objects and includes an easily adjusted valve for calibrating the system to any length of fluid line.

It is still a further object of the invention to provide a method of operating a gauging system that permits one to easily and accurately adjust the system for any length of fluid line.

It is yet another object of the invention to provide a method of operating a molding and gauging system that provides one or more of the above objects and allows one to adjust the system at an operating site with the die open.

It is still another object of the invention to provide one or more of the above objects with a fluid valve that provides low restriction to fluid flow, and thus does not add further variables to the system that must be accounted for.

It is also an object of the invention to provide a simple and economically manufacturable valve that provides little restriction to fluid flow and can precisely vary and control fluid flow at high flow rates.

The invention provides a gauging system for providing an indication of the distance of a surface from a first orifice, the system comprising: a source of fluid under controlled pressure; outlet means for providing an outlet for the fluid remote from the pressure source, the outlet means comprising a fluid line and the first orifice;

a transducer communicating with the fluid line for monitoring the pressure in the fluid line and for providing an output signal indicative of the distance of the surface from the first orifice; means for calibrating the gauging system; and adjusting means for adjusting the system for different outlet means. Preferably, the adjusting means comprises a fluid valve. Preferably, the fluid valve is located between the transducer and the first orifice. Preferably, the system includes a second orifice located between the pressure source and the fluid line, and the fluid valve is located between the second orifice and the first orifice. Preferably, the fluid valve comprises: a first member having a first valve port and a channel communicating with the first valve port, the channel having a first channel portion with a wall having a first diameter and a second channel portion with a wall having a second diameter larger than the first diameter thereby forming a shoulder between the first channel portion and the second channel portion; a second member receivable in the second channel portion and having: a second valve port, first surface means for sealingly engaging the shoulder, and a plurality of passages passing through the first surface means and communicating with the second valve port whereby fluid may flow from the first valve port to the second valve port; sealing means for preventing fluid flow between said second member and said wall of said second channel portion of said first member; and control means for permitting controlled movement of the first surface means toward the shoulder and away from the shoulder to control fluid flow through the valve. Preferably, the shoulder and the first surface means are in the form of a frustum of a cone. Preferably, the control means comprise threads formed on the first and second members.

In a preferred embodiment, the invention provides a molding system comprising a first mold member having a first surface; a second mold member having a second surface; support means for supporting the first and second members with the first surface facing the second surface; means for moving one of the first and second members thereby changing the distance between the first and second surfaces; a sensor system for sensing the distance between the first and second surfaces, the sensor system including: a source of fluid under controlled pressure, an orifice in the first surface, a fluid line connecting the source of fluid and the orifice, a transducer communicating with the fluid line for monitoring the pressure in the fluid line and for providing an output signal indicative of the distance between the first and second surfaces; and an adjusting means located between the source of fluid pressure and the orifice for adjusting the sensor system to account for different lengths of the fluid line.

In a further aspect, the invention provides a method of operating a gauging system including a source of fluid under controlled pressure; first outlet means for providing an outlet for the fluid remote from the pressure source, the first outlet means comprising a first fluid line and an orifice, the first fluid line connecting the pressure source and the orifice; a transducer communicating with the first fluid line for monitoring the pressure in the first fluid line and for providing an output signal indicative of the distance of a surface from the orifice; and means for calibrating the gauging system; comprising the steps of: providing an adjusting means for adjusting the system for different outlet means; calibrating the gauging system; detaching the first outlet means; attaching a second outlet means; and adjusting the adjusting means until the system is again in calibration. Preferably, the step of attaching comprises attaching a second fluid line having a length that is different than the length of the first fluid line. Preferably, the adjusting means comprises a fluid valve and the step of adjusting comprises adjusting the fluid valve. Preferably, the step of calibrating comprises the steps of placing a calibrating surface at a plurality of determined distances from the orifice of the first outlet means and measuring the output of the transducer for each of the plurality of distances, and the step of adjusting comprises locating an adjustment surface a distance from the orifice of the second outlet means equal to one of the determined distances and adjusting the valve until the transducer output is within a predetermined range including the output measured for the one of the determined distances during the step of calibrating. Preferably, the step of calibrating includes the steps of placing the calibration surface at a distance that is at least as far from the orifice of the first outlet means as the distance at which the system indicates an essentially open space in front of the orifice and measuring the output of the transducer, and the step of adjusting comprises locating the adjustment surface at location that is at least as far from the orifice of the second outlet means as the distance at which the system should indicate an essentially open space in front of the orifice and adjusting the valve until the transducer output is within a predetermined range including the output measured when the calibration surface was placed so that the orifice was essentially open. Preferably, the method further includes the step of selecting the predetermined range. Preferably, the first fluid line has a length equal to or greater than the length beyond which the transducer output is no longer affected by further increasing the length of the fluid line. Preferably, the first fluid line has a length of 15 feet or greater. Preferably, the adjusting means comprises a valve and the step of calibrating comprises setting the valve in the wide open position.

In yet another aspect, the invention provides an adjustable fluid flow control valve, comprising first means forming an axial passageway and a first surface extending transversely from the axial passageway and adapted to provide a fluid seal, and second means forming a plurality of generally axial passageways opening in an array into a second surface adapted to provide a fluid seal for said passageways with said first surface, the first means and second means being adapted for controllable relative movement to provide a variable axial space between the first and second surfaces and an adjustable axial fluid flow through said valve. Preferably, the first surface of said first means includes a frustoconical portion around the axial passageway, the second surface of said second means is a mating frustoconical surface, and the plurality of generally axial passageways open into the second surface in an array around the axial passageway of the first means. Preferably, the axial passageway of the first means extends upstream of said first surface and comprises, at least in part, a threaded cylinder upstream of the first surface, and the second means comprises, at least in part, a threaded outer cylindrical surface having an outside diameter fitting within the upstream threaded cylinder of the first means and mating the threaded cylinder portion of the first means so that first means carries the second means, the first and second means being adapted thereby for relative movement and adjustment of the axial space between said first and second surfaces through relative rotation of the first and second means. Preferably at least one of the first or second means has a tool engagable outer surface, or is adapted to be engaged by an automatically operated actuator.

A fluid valve of the invention comprises: a first member having a first valve port and a channel communicating with the first valve port, the channel having a first channel portion with a wall having a first diameter, and a second channel portion having a wall with a second diameter larger than the first diameter thereby forming a shoulder between the first channel portion and the second channel portion; a second member receivable in the second portion of the channel and having a second valve port, first surface means for sealingly engaging the shoulder, and a plurality of passages passing through the first surface means and communicating with the second valve port whereby fluid may flow from the first valve port to the second valve port; sealing means for preventing fluid flow between said second member and said wall of said second channel portion of said first member; and control means for permitting controlled movement of the first surface means towards the shoulder and away from the shoulder to control fluid flow through the valve. Preferably, the shoulder and the first surface means are in the form of a frustum of a cone. Preferably, the control means comprise threads formed on the first and second members. Preferably, with the first or the second member (or both) has an outer portion with tool engagable surface, the channel is generally cylindrical and has a common cylindrical axis with the outer surface of the second member and the threads are formed on the wall of the channel and the outer surface of the second member. Preferably, the sealing means comprises a groove formed in the outer surface of the second member and 0-ring means receivable in the groove for sealingly engaging the wall of the second channel portion. Preferably, the first and second valve ports are generally cylindrical and lie along a common cylindrical axis. Preferably, the control means for movement of the first surface means toward and away from the shoulder includes a drive means comprising a computer controlled stepping motor.

In still another aspect the invention provides a gauging system comprising: a pressure chamber; a source of fluid under controlled pressure communicating with the pressure chamber; connecting means for connecting the pressure chamber to an orifice remote from the gauging system, the connecting means comprising a fluid line that is one of a plurality of different lengths; a transducer communicating with the pressure chamber for monitoring the pressure in the pressure chamber and for providing an output signal indicative of a condition at the orifice; means for calibrating the gauging system; and adjusting means for adjusting the system for different lengths of fluid line whereby the calibration for one length of fluid line can be applied to a second length of fluid line.

The invention provides a gauging apparatus and method that can not only be adjusted easily for different lengths of fluid line, but also provides a system providing greater accuracy than the prior systems.

The invention also provides an adjusting valve which may adjust a gauging system for other system variables and may be usefully applied in other industrial systems where it is desirable to provide precise adjustment of high rates of fluid flow in small increments, either automatically or manually.

Numerous other features, objects and advantages of the invention will become apparent from the following description when read in conjunction with the accompanying drawings.

DESCRIPTION OF THE PREFERRED EMBODIMENT

Figure 1:
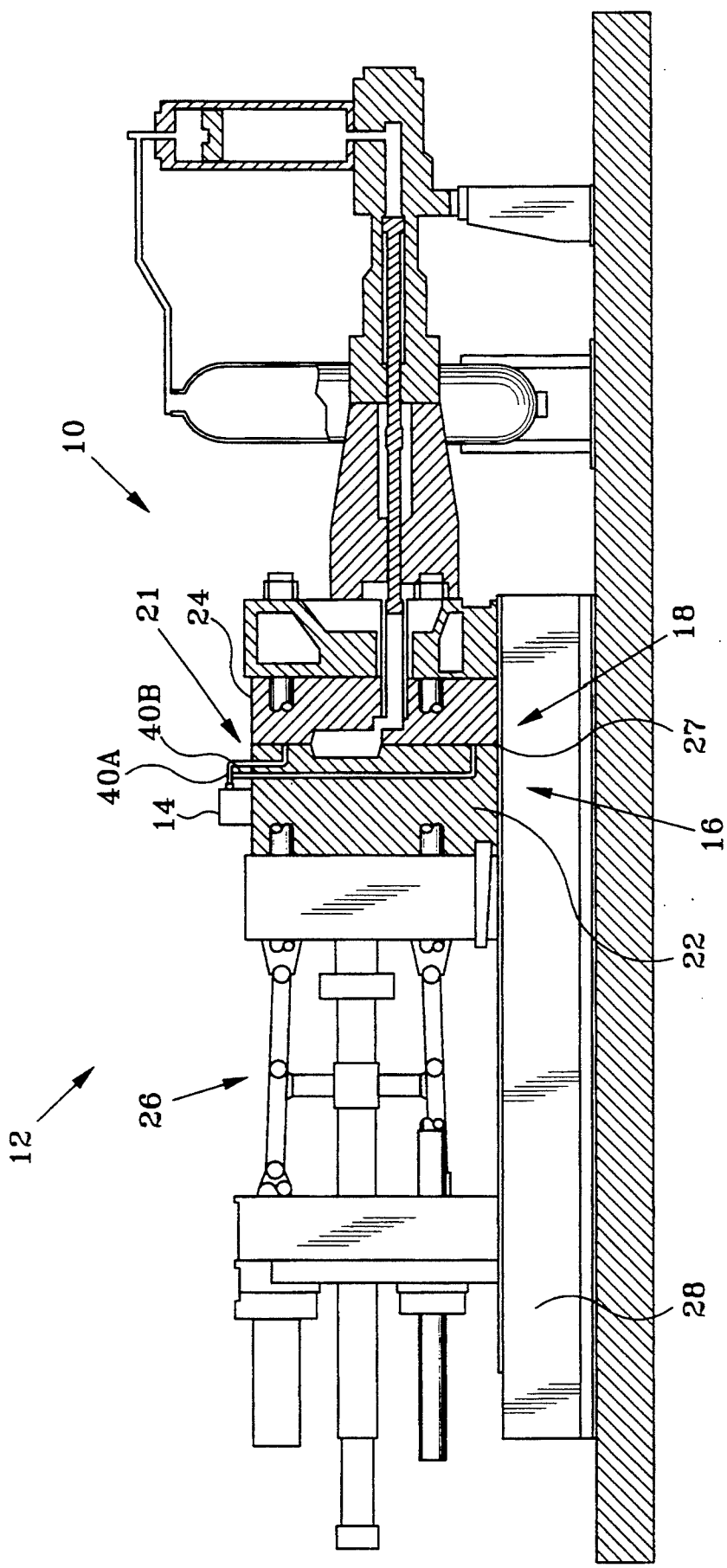
FIG. 1 is a side, partially sectioned, partially cutaway view of a die casting machine with a portion of a gauging system to illustrate the invention.
Figure 2:
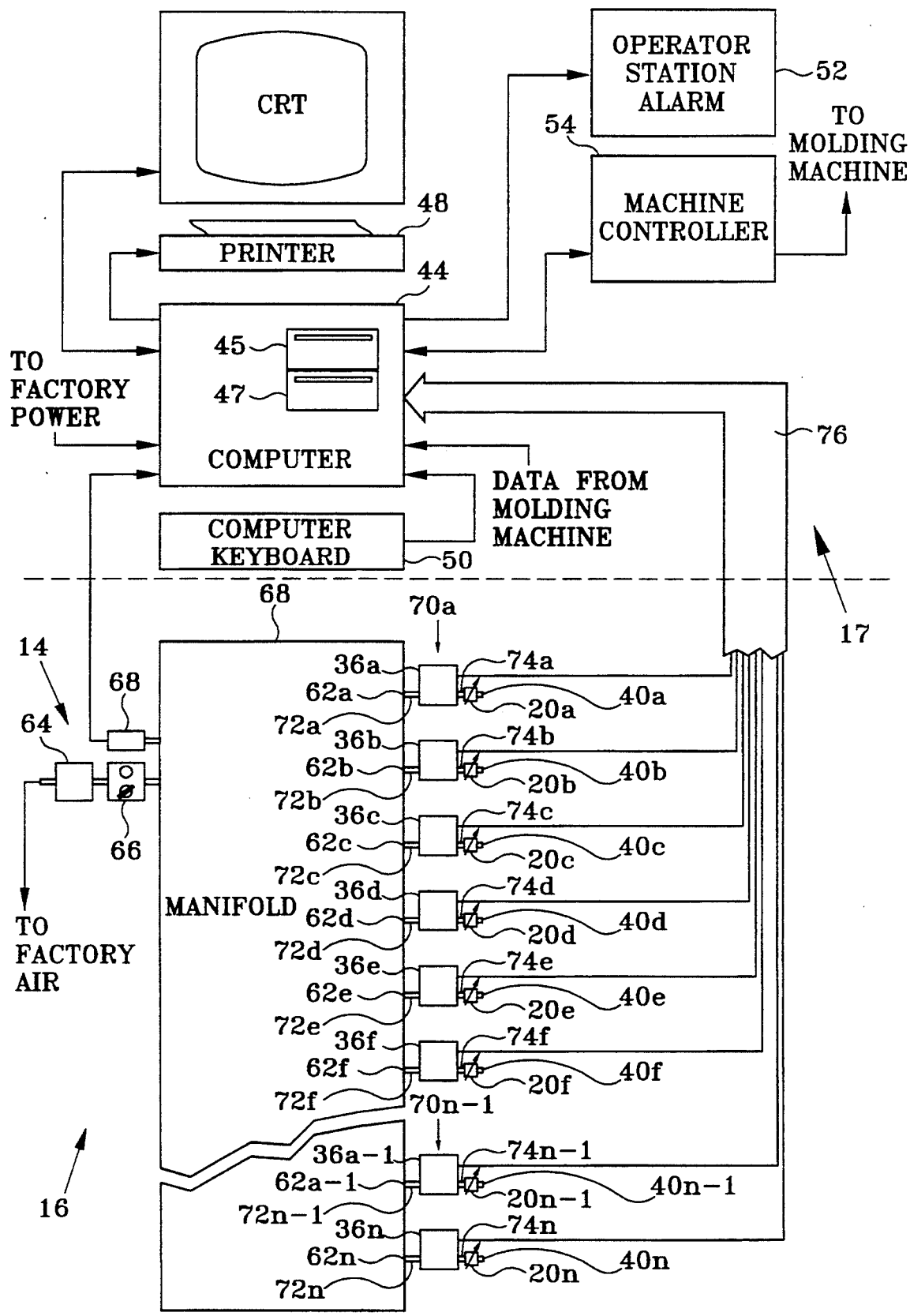
FIG. 2 is a diagrammatic illustration of the gauging system of FIG. 1 including the portion not shown in FIG. 1.
Figure 3:
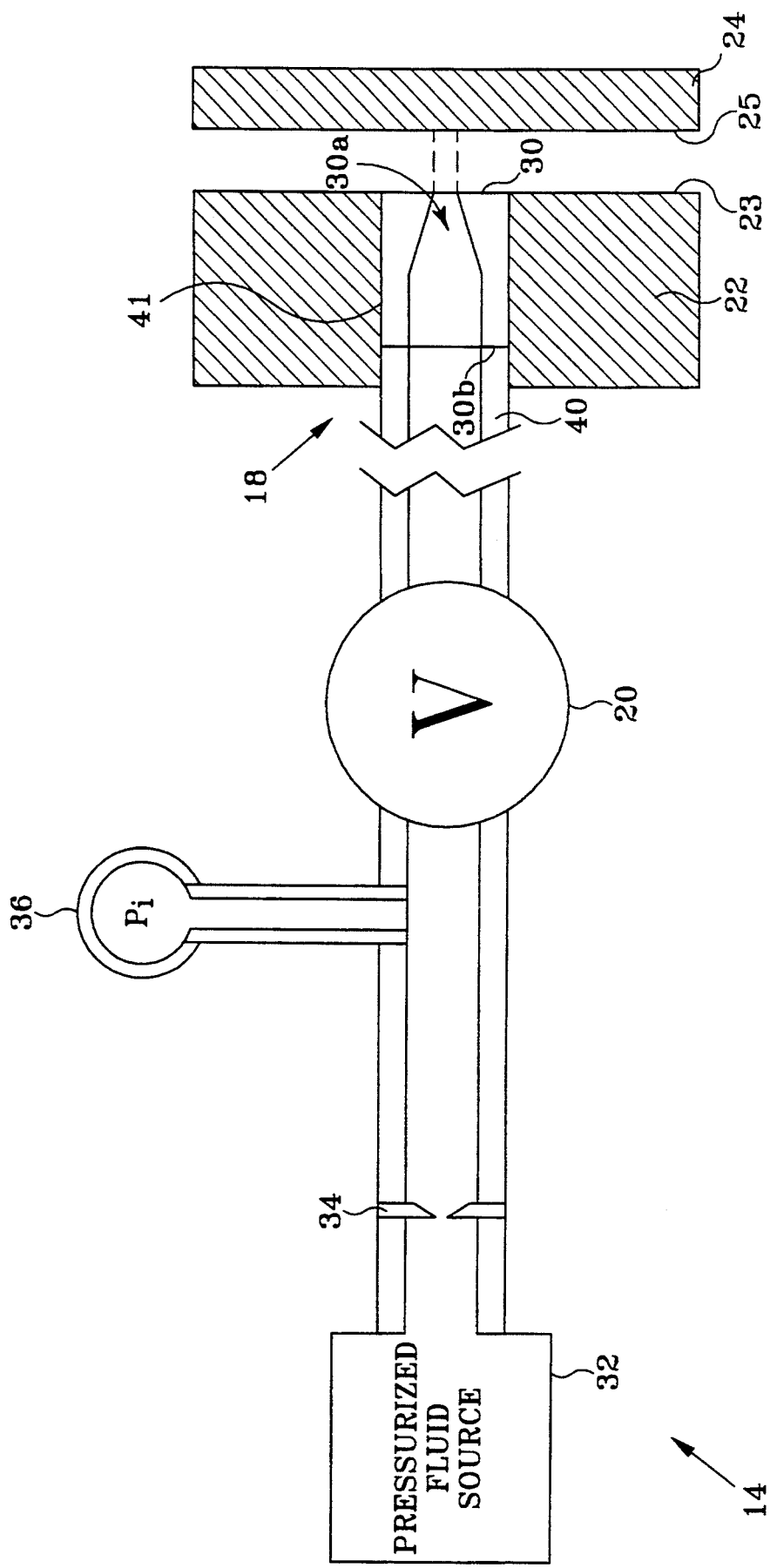
FIG. 3 is a diagrammatic illustration in more detail of a mechanical portion of the gauging system of FIG. 1.

A preferred embodiment of a molding and gauging system 10 according to the invention is shown in FIGS. 1 through 3. FIG. 1 shows an exemplary die casting machine 12 with a mechanical unit 14 that houses much of the mechanical portion of the gauging system 16 mounted on it, FIG. 2 shows the gauging system in greater detail, including the mechanical unit 14 and the electrical unit 17, which is generally housed in a separate cabinet which is located adjacent the die casting machine but is not shown in FIG. 1 for clarity. FIG. 3 illustrates diagrammatically the mechanical portion of the gauging system in more detail. The mechanical portion includes fluid valve 20, which is shown in detail in FIGS. 6A through 6F. It should be understood that the embodiment shown and discussed is only one of many possible embodiments of the invention, and is presented by way of illustration only, and is not intended to limit the invention.

As shown in FIG. 1, the die casting machine 12 comprises mold 21, which includes a first mold member 22 and a second mold member 24. Die casting machine 12 also comprises support means 28 for supporting the two mold members 22 and 24, and press drive means 26 for moving member 22 toward and away from member 24 to open and close the mold 21. First mold member 22 has a first mold surface 23 (FIG. 3) and second mold member 24 has a second mold surface 25, which surfaces 23 and 25 meet at an interface, line 27 (FIG. 1), when the mold is closed.

The gauging system of the invention includes a gauging system 16, a portion of which can be built into the dies used with casting machine 12, as indicated by FIGS. 1 and 3; that is, first mold surface 23 has a first orifice 30 (FIG. 3) formed in it. First orifice 30 is part of an outlet means 18, which includes fluid line 40 and orifice 30. The gauging system 16 is an integral part of the complete molding and gauging system 10, but, for purposes of simplifying discussion, can be considered, as shown in FIG. 3, to include pressurized fluid-source 32, second orifice 34, transducer 36, adjustment valve 20, first orifice 30, and fluid line 40 which passes through bore 41 in first mold member 22 and connects the valve 20 to orifice 30.

In preferred gauging systems, the portion of the outlet means 18 forming orifice 30 includes a short outlet passageway 30a defined by smooth, cylindrical walls about a central axis. The short outlet passageway 30a terminates in an outlet orifice 30 which is generally coplanar with the first surface 23. The entrance of the outlet passageway 30a is surrounded by a wall portion 30b that is substantially perpendicular to the central axis of the outlet passageway 30a. In one nozzle forming means 30 of this invention, the outlet passageway 30a is formed by reaming the passageway to provide a "0" taper. The diameter of outlet passageway 30a and orifice 30 is 0.147 inches and the length of the short outlet passageway 30a is 0.281 inches. Fluid flowing through the outlet means 18 encounters the wall portion or shoulder 30b extending in a direction perpendicular to the fluid flow, resulting in constriction of the fluid flow at the entrance of passageway 30a. The fluid continues to flow from the entrance through the outlet passageway 30a to the outlet orifice 30 where the fluid is expelled toward the second surface 25 of the second mold member 24. Changing the distance X between first mold member 22 and second mold member 24 with press drive means 26 changes the pressure within fluid line 40, which forms a pressure chamber, and at transducer 36. A computer 44 (FIG. 2) reads the output of transducer 36 and uses the output to calculate the distance between the first mold surface 23 and second mold surface 25 and produces an audio, visual, printed and/or magnetic storage record indication of the mold operation.

The dies of die casting machine 12 can include many other interacting mold surfaces, such as slides and stops. Each pair of interacting mold surfaces may include a first orifice 30, a fluid line 40, and associated transducer, such as 36a through 36n (FIG. 2) which measure the distances between the respective surfaces. Only two such fluid lines 40a and 40b are shown in FIG. 1 for clarity. Although FIG. 1 shows the mechanical unit 14 carried by die member 22, it can be carried by the platens or other portions of the die casting machine 12 to facilitate the changing of dies. The die casting machine is conventional and the details of the die casting machine, the mounting of the first orifices 30 and their locations are described in detail in U.S. Pat. No. 4,824,351 which is hereby incorporated by reference. Thus, these details will not be repeated herein.

As can be seen in FIG. 1, the fluid lines, such as 40A and 40B, are preferably of different lengths in such a molding and gauging systems because the first orifices 30 are located at different parts of the die and otherwise there would be large loops of excess fluid line which would tend to get caught in the machinery. Because the gauging system may be used with different machines and dies, the precise length of fluid lines to be used with each outlet means and transducer/orifice combination cannot be anticipated at the factory. Since the pressure at the transducers 36a–36n is affected by the length of fluid line used, final calibration must be completed after the fluid lines such as 40A and 40B are attached at the operating location for maximum accuracy. According to the invention, this final calibration is performed by opening the mold, attaching the desired length of fluid line 40a through 40n between each transducer 36a through 36n and its associated orifice 30, and then simply adjusting the associated fluid valves 20a through 20n until the display 46 (FIG. 2) indicates that the transducer is reading within specification for the mold open position. The calibration procedure will be discussed in more detail below.

Turning now to a more detailed description of the invention, a gauging apparatus according to the invention is shown in FIG. 2. A dotted line through the center of FIG. 2 separates the electrical portion in the upper part of FIG. 2 from the mechanical portion in the lower part of FIG. 2. The electrical portion includes a computer 44 having a pair of floppy disk drives 45 and 47 and an internal hard disk drive, a display 46, a printer 48, a computer keyboard 50, an operator station alarm 52, and a machine controller 54. In the preferred embodiment the computer 44, display 46, printer 48, and keyboard 50 are assembled in a steel enclosure (not shown) having one or more closable access doors to permit the system to be located adjacent to a die casting machine and to be protected from the factory environment. In the preferred embodiment, the computer is an IBM compatible personal computer with at least 256K of RAM and MS-DOS of Version 2.1 or higher. In large systems that include, say, sixty-four pressure transducers 36a–36n, a computer with 512K of RAM or higher is preferred. For convenience, any one of the monitoring means 70a–70n, fluid lines 40a–40n, adjusting means 20a–20n may be referred to by 70i, 40i 20i, etc.

The mechanical unit 14 includes a manifold 60 having a plurality of threaded outlets 62a through 62n, an air filter and dryer 64, an adjustable pressure regulator 66, a manifold pressure transducer 68, a plurality of monitoring means 70a through 70n, each of which is fitted with a threaded coupling, such as 72a–72n, with which it is attached to one of the threaded outputs 62a through 62n, and a plurality of adjusting means 20a through 20n, each of which is attached to one of the monitoring means 70a through 70n via a threaded coupling, such as 74a–74n. Manifold 60 is preferably as small as possible and manufactured in accordance with the ASME boiler and pressure vessel code, having sufficient volume to permit the number of attached monitoring means, for example, for supplying thirty-two monitoring means 70a through 70n. A box-like manifold having dimensions of about 2.5 inches by 8 inches by 14 inches has been found satisfactory. Pressure regulator 66 is preferably a Model R216-02F air pressure regulator manufactured by Watts Fluid Air, Inc. of Kitlarg, Me. Each of the monitoring means 70a through 70n includes a pressure transducer, 36a through 36n, and a second orifice 34 which are arranged as shown in FIG. 3. Preferably, each second orifice 34 is of the same size, which is preferably 0.081 inches (0.21 cm) in diameter. Such second orifices can be purchased from the O'Keefe Controls Company of Trumbull, Conn. as their No. B-16 with a 0.081 inch diameter. Although exact dimensions of such orifice forming means are not critical, the length of the second orifice passageway must be short enough so that significant boundary layer effects within the second orifice passageway are eliminated. Each transducer 36a through 36n is preferably a transducer such as the Omega Engineering, Inc. PX236 pressure transducer fitting. Unused threaded manifold outlets 62a through 62n can be provided with pipe plugs to close the outlets.

As shown in FIG. 2, filter/dryer 64 is attached to a source (not shown) of up to 80 psi of pressurized factory air and is connected to pressure regulator 66 which is connected to manifold 60. Manifold pressure transducer 68 is also connected to manifold 60 and connected electrically to computer 44. Each valve 20a through 20n is connected via a fluid line 40a through 40n respectively to one of n first orifices 30 as shown in FIG. 3. The orifices 30 are located with respect to the machine surfaces or die surfaces to be monitored. All orifices 30 are preferably of the same size, preferably as set forth above about 0.147 inches (0.373 cm) diameter. Fluid lines 40a through 40n are variety of lengths, generally 15 feet or shorter, and are preferably made of flexible, high-temperature-resistant teflon tubing with an internal diameter of about 0.250 inches (0.64 cm). Each of transducers 36a through 36n is electrically connected to computer 44 via cable 76. Computer 44 is also connected to a source of power, to the computer keyboard 50, to a data input from the die casting machine 12, to the machine controller 54, to the operator station alarm 52 and to the display 46 which is preferably a conventional color cathode ray tube display. The machine controller 54 is connected to the die casting machine 12.

In the preferred embodiment of this invention, each of the adjusting means 20a through 20n is an adjustable fluid flow valve 20 as shown in detail in FIGS. 6A through 6F. Valve 20 includes a first means or member 78, a second means or member 80 and sealing means 103. Valve 20 also includes third means 89 for permitting controlled movement of second surface 112 (FIG. 6C) toward and away from first surface 99 (FIG. 6F) to control fluid flow through the valve 20, and sealing means 103 for preventing fluid flow between second member 80 and the wall 93 of second channel portion 92 of first member 78. Third means 89 includes threads 100 and 120. The outer surfaces of the first and second means 78 and 80 are preferably provided with tool-engaging surfaces, such as nuts 104 and 109. Sealing means 103 includes grooves 114 and 116 and O-rings 82 and 84.

Adjustable fluid flow control valve comprises a first means 78 forming an axial passageway 92 and a first surface 99 extending transversely from the axial passageway 92 and adapted to provide a fluid seal, and a second means 80 forming a plurality of generally axial passageways 111 opening in an array into a second surface 112 adapted to provide a fluid seal for the plurality of passageways with the first surface 99, the first means 78 and second means 80 being adapted for controllable relative movement to provide a variable axial space between the first surface 99 and second surface 112 and an adjustable axial fluid flow through the valve 20. In the preferred valve shown in FIGS. 6A-6F, the first surface 99 of said first means 78 forms a frustoconical surface portion around the axial passageway 92, the second surface 112 of the second means 80 is a mating frustoconical surface, and the plurality of generally axial passageways 112 open into the second surface 112 in an array around, and preferably surrounding the axial passageway 92 of the first means 78. In addition, the axial passageway 92 of the first means 78 extends upstream of the first surface 99 and comprises, at least in part, a threaded cylinder 100 upstream of the first surface 99, and the second means 80 comprises, at least in part, a threaded outer cylindrical surface 120 having an outside diameter fitting within the upstream threaded cylinder 100 of the first means 78 and mating the threads of the first means 78 so that the first means 78 thereby carries the second means 80 and the first and second means 78, 80 are adapted thereby for relative movement and adjustment of the axial space between said first surface 99 and second surface 112 through relative rotation of said first and second means. At least one of said first or said second means may have a tool engagable outer surface, or may be provided with a ratchet surface or geared surface to permit adjustment by an automatically operated ratchet device or stepping motor. As shown, the outer surface portions 104 and 109 of both the first and second means are provided with hexagonal nut-like shapes to permit the use of wrenches for adjustment.

Figure 6A:
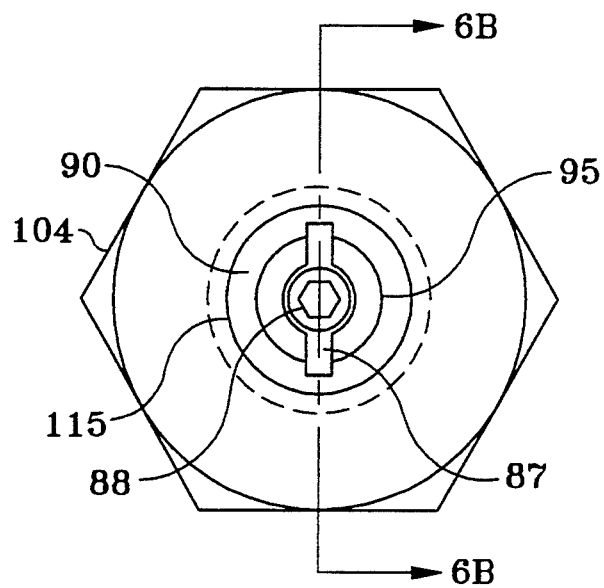
FIG. 6A is an end plan view of the preferred embodiment of an adjustment valve according to the invention.
Figure 6B:
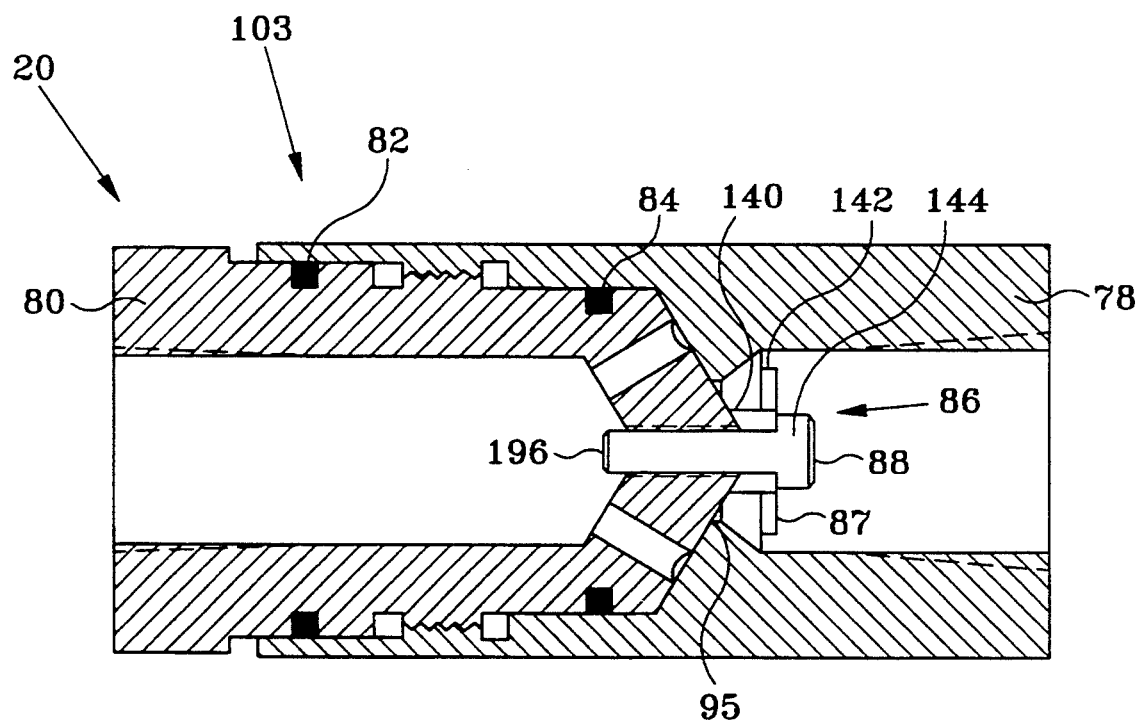
FIG. 6B is a side cross-section of the valve of FIG. 6A taken through the line 6B—6B of FIG. 6A.
Figure 6C:
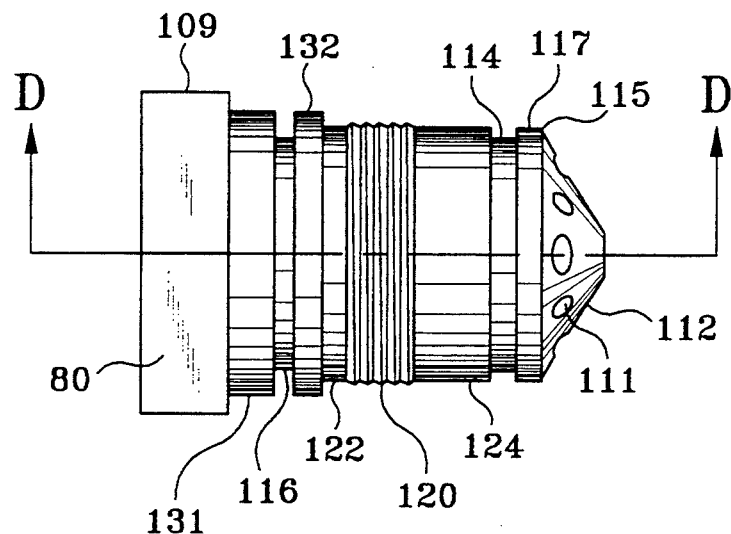
FIG. 6C is a side plan view of the male portion of the valve of FIG. 6A.
Figure 6D:
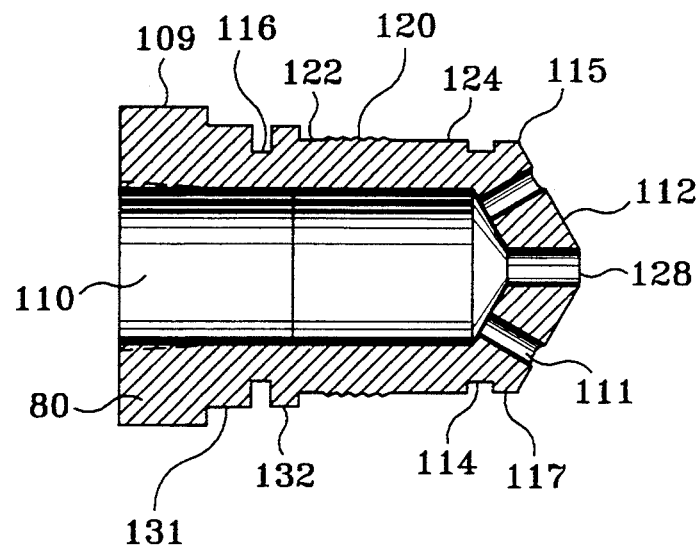
FIG. 6D is a cross-section through the line 6D—6D of FIG. 6C.
Figure 6E:
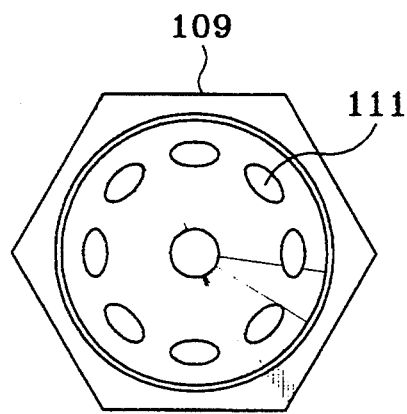
FIG. 6E is an end plan view of the male valve portion of FIG. 6C.
Figure 6F:
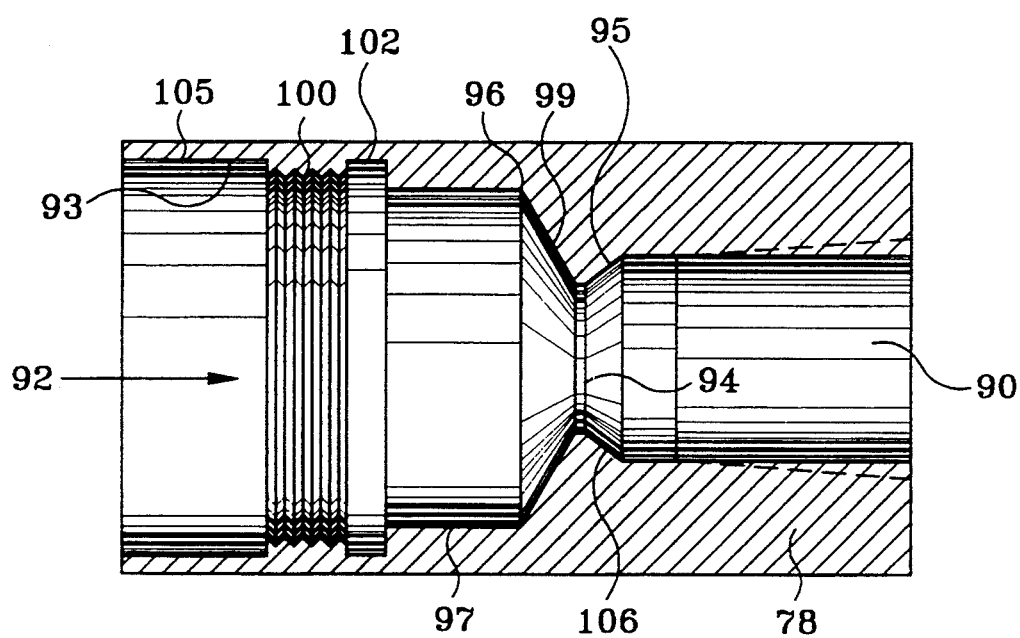
FIG. 6F is a cross-sectional view of the female portion of the valve of FIG. 6 taken through the line 6B—6B of FIG. 6A.

First means or member 78 is shown in FIGS. 6A, 6B and 6F. Second means or member 80 is shown in FIGS. 6B, 6C, 6D and 6E. First means or member 80 preferably has a first valve port 90, and a channel 92 communicating with the first valve port 90. Channel 92 has a first channel portion 94 with a wall 95 having a first diameter and a second channel portion 92 having a wall 97 with a second diameter larger than the first diameter, thereby forming a shoulder 99 between the two channel portions 94 and 92. Channel 92 also has threads 100 formed in an area of its wall, and ring shaped undercuts 102 and 105 on either side of the threads 100. Preferably, the first member has a generally hexagonal outer surface 104 with a length of about 1.65 inches and a diameter of 0.87 inches to allow it to be held or turned with a wrench. Valve port 90 is a 7/16 inch drill bore about 0.65 inches to a depth of about ¼ inch. Valve port 90 is tapered inward from the end of the pipe threads at an angle of about 30° to form shoulder 106. First channel portion 94 has a length of about 0.03 inches and a diameter of about 0.31 inches. The first surface 99 forms a shoulder tapered at about 29° with respect to a plane perpendicular to the central axis of channel 92 to form a surface shaped like a frustum of a cone. Second channel portion 92 meets shoulder 99 at a plane 96 about 0.875 inches from the left end of member 78 as shown in FIG. 6F and has a diameter of about 0.687 inches for a distance of about 0.28 inches. An undercut 102 is then formed with a diameter of about 0.76 inches and a width of about 0.09 inches. Threads 100 are preferably ¾-24 UNS threads, with a major diameter of about 0.710 inches and about 0.19 inches in width. Undercut 105 is about 0.770 inches in diameter and about 0.315 inches wide.

Second member 80 is roughly cylindrical in shape with a hex-shaped nut 109 formed on the left end as shown in FIG. 6C. It preferably comprises a second valve port 110 (FIG. 6D), first surface means 112 for sealably engaging the shoulder 99 of first member 80, and a plurality of generally axial passages 111 passing through first surface means 112 and communicating with second valve port 110. Member 80 also includes grooves 14 and 116, threads 120 and undercuts 122 and 124, all formed in its outer surface. Second member 80 is about 1.31 inches long and has a dimension of 0.88 inches across the flats of nut 109, which has a width of about 0.25 inches. Outlet 110 is a 7/16 inch drill bore about 1.00 inch long and then tapering inward at about 30°. (Second member 80 may be provided with a bore 128 which is formed by a No. 37 drill as set forth below.) Surface means 112 comprises an annular frustoconical surface tapering at a 30° angle with respect to a plane perpendicular to the central axis of threads 120 for a horizontal distance of 0.16 inches from the right end of second member 80 as shown in FIG. 6C. There are preferably eight of passages 111, each drilled with a ⅛ inch drill at an angle of 30° with respect to the central axis of threads 120, perpendicular to surface means 112 and with their centerlines at a distance of about 0.22 inches from outer edge 115 of surface 112. Surface 117 has a diameter of about 0.687 inches and is about 0.070 inches wide Groove 114 has a diameter of about 0.571 inches and is about 0.080 inches wide. Undercut 124 is about 0.687 inches in diameter and about 0.240 inches wide. Threads 120 preferably are ¾-24 UNS threads with a major diameter of 0.748 inches. Undercut 122 is about 0.69 inches in diameter and about 0.06 inches wide. Groove 116 is about 0.654 inches in diameter and about 0.080 inches wide. The surfaces 131 and 132 on either side of groove 116 are each about 0.770 inches in diameter and are 0.13 and 0.06 inches wide, respectively.

If desired, the valve 20 may be provided with a keeper 86, shown in phantom lines. Keeper 86 (FIG. 6B) comprises a stop member 87 and a pin 142. Member 87 may be threaded into a threaded bore 128 to provide a seal around the keeper. Pin 142 is longer than the diameter of wall 95 so that the second member 80 cannot be separated from the first member 78.

O-rings 82 and 84 are preferably (size or gauge number). All parts of the fluid valve 20 are preferably made of brass or other suitable material except O-rings 82 and 84, which may be made of any suitable elastomer.

In an alternative embodiment of the adjustable fluid valve 20, hex nut portion 109 may be replaced with a spur gear portion for automatic operation. A stepping motor that is operated by computer 44, or a remote control, can then drive the gear portion of second member 80 and thereby vary the spacing between surfaces 112 and 99 to adjust the calibration of the system, or in other applications, to control flow through the valve from a remote location.

The fluid valve 20 according to the invention is assembled and operated as follows. The O-rings 82 and 84 are inserted into grooves 116 and 114, respectively, and male second member 80 is inserted into female first member 78 and rotated clockwise to screw threads 120 onto threads 100 until surface 112 seats on shoulder 99. Rotating the second member counter-clockwise opens the valve. Undercuts 102, 105, 122 and 124 provide a small clearance between the threads and the wall of the opposing valve member during insertion of the male second member 80 into first female member 78 and when the valve is in the open condition. When a keeper is used and the valve is opened, pin 142 can catch on shoulder 106 of first member 78.

It is a feature of the fluid valve 20 according to the invention that its structure provides precise adjustment of high flow rates of a gas, typically air, with no appreciable restriction or pressure drop across the valve. This feature results from the axial flow path between the inlet and outlet ports 110 and 90, which allow fluid to pass directly through the valve with little change of direction, and by the relatively large, unobstructed flow channels and passages when the valve is in the open position. This structure makes it possible to accurately adjust high flow rates in small increments, for example, from 99% flow rate to 98% flow rate.

Figure 7:
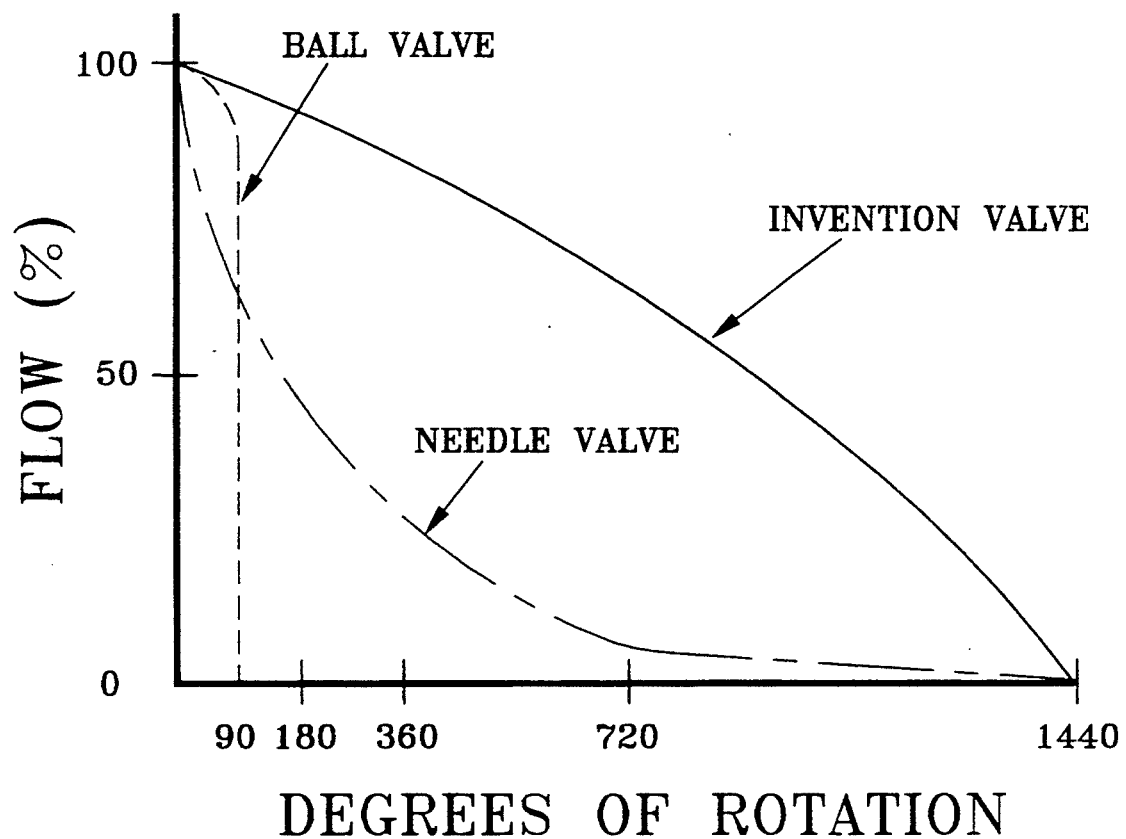
FIG. 7 is a flow versus degrees of rotation curve illustrating the performance of the valve according to the invention as compared to a ball valve and a needle valve.

FIG. 7 compares the percent of flow versus degrees of rotation curve for a fluid valve 20 according to the invention and a typical ball valve and needle valve. The curves show that for high flow rates, the percent change in flow per degree of rotation is much smaller for the valve according to the invention than for either the ball valve or the needle valve. The curve for the valve according to the invention is also much more uniform throughout its range and thus lends itself to accurate computer control. Its response is also much more predictable for manual control.

Figure 4:
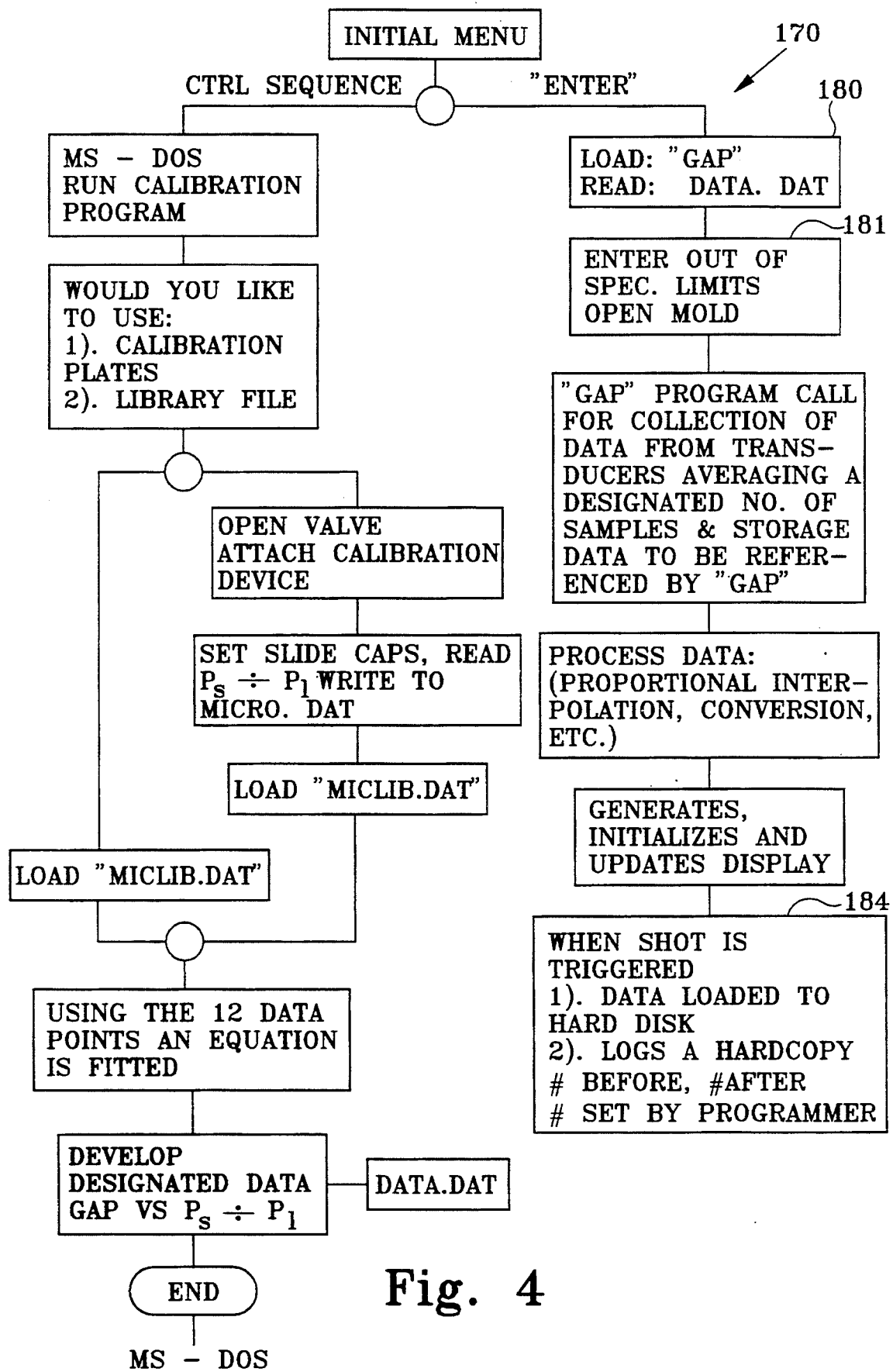
FIG. 4 is a flow chart showing the operation of the software used in the invention.

A flow chart 170 of the preferred computer program for calibrating and operating a gauging system 16 according to the invention is shown in FIG. 4. When the program is called up, the initial menu advises the operator to hit "ENTER" to begin normal operation. The menu also includes a selection for initiating the calibration procedure, but advises the operator to enter a coded control sequence before the program exits to the disk operating system, preferably MS-DOS, to enable the calibration of the system. When the program control exits to the disk operating system, a screen advises the operator to insert the calibration disk into the computer system memory. Upon insertion of the calibration disk, the entry of "RUN", the calibration program generates a menu asking the operator if he would like to use calibration plates or a library file. If the operator selects the library file, the program loads the appropriate memory of the computer with "MICLIB.DAT" data, which is data resulting from a prior calibration applicable to the system in use.

If the operator selects calibration from calibration plates, the calibration program generates a plurality of menus on display 46 advising the operator to open a selected one of the valves 20a through 20n, say 20i, to the "wide open" position and attach a gap calibration device to the valve. The calibration device includes a length of fluid line 40, or an analog thereof. Preferably this length of line is chosen to be at least as long as the length beyond which the output of transducer 36i is no longer affected by further increasing the length of line. It has been found that this length of line is about 15 feet for the systems described herein. The calibration device also includes a vise-like device including, in one surface of the vice, a calibrated air orifice corresponding to those used in machines, or dies to be monitored, and, in the other surface a solid opposing face. Following the instructions on display 46 for appropriate gap spacings, the operator then proceeds to insert a plurality of plates having different precise thicknesses between the surfaces of the device, and closing the device upon them, to provide a plurality of known spacings or air gaps between the surfaces of the calibration device. For each such air gap, computer 44 measures the output of the transducer 20i, Pi, and the output of the supply transducer 68, Ps, computes the dimensionless quantity Ps/Pi, and stores the dimensionless parameter Ps/Pi and the corresponding air gap X in the memory of computer 44. Upon the completion of storage of the data for one spacing, the calibration program advises the operator to change the calibration plate to obtain a further air gap spacing and repeat the steps to obtain another calibration point. This calibration procedure continues through a plurality of calibration points, preferably 11 points over a range of air gap spacing from 0 to 0.07 inches plus a "mold open" spacing, i.e., a spacing that is at least as wide as the spacing that the system indicates an essentially open space in front of the orifice. Generally any spacing 0.3 inches or larger will be seen as essentially open; that is, beyond this distance, opening the spacing any wider will not change the pressure within the monitor means and will not affect the transducer reading. This calibration procedure is repeated for as many monitoring means $70a$ through $70n$ as are to be calibrated.

The collected data is stored in a file identified as for example as "MICRO.DAT". Upon completion of the "MICRO.DAT" file, the calibration program loads the "MICRO.DAT" file data into a program for curve fitting for interpolation and calculates an equation that corresponds to the data, using a least squares approximation, and, preferably, a seventh order polynomial of the form:

$$X = C_7 P^7 + C_6 P^6 + C_5 P^5 + C_4 P^4 + C_3 P^3 + C_2 P^2 + C_1 P + C_0 \quad (1)$$

where $P = Ps/Pi$ and $X =$ gap spacing. Eleven data points provide adequate data to reduce interpolation errors to an acceptable level when such a least squares procedure is used to provide an equation for interpolation between calibration data points. The program also stores the minimum value of Ps/Pi (generally about 1) and the maximum of PS/Pi (generally about 4) for the calibration of each transducer means $70a$ through $70n$.

Upon the completion of the curve-fitting program, the calibration program divides the interval between the minimum value of Ps/Pi and the maximum value of Ps/Pi into 2500 equal intervals and, for the value of Ps/Pi at each of the intervals, calculates from the equation resulting from the curve fitting, the corresponding values of X (gap spacing). The minimum and maximum values of Ps/Pi, the value of the interval, and the value of X for each interval are then stored in a file designated as, for example, "DATA.DAT". The GAP program (see below) and associated DATA.DAT file complete the calibration program, and the GAP program and the DATA.DAT program file are stored by computer 44 for use in the operating program. When the calibration is complete, the menu prompts the operator that the calibration is complete and advises the operator to push "ENTER" if he wishes to enter the operating program.

Figure 5:
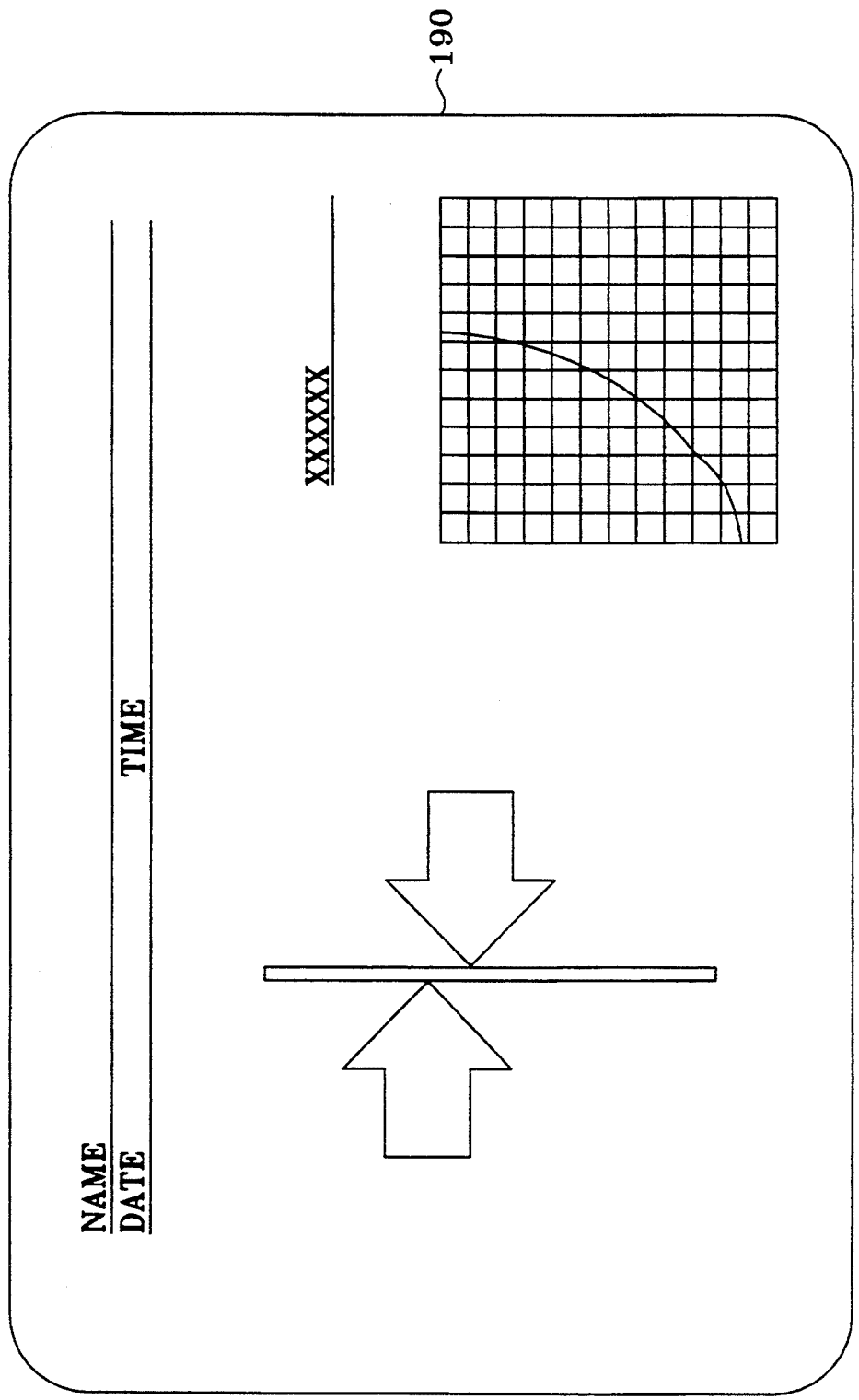
FIG. 5 shows a typical display on the CRT while the adjustment valves are being adjusted.

The above calibration is generally done at the factory at which the gauging system 16 is manufactured. The gauging system 16 is then shipped to a customer and is connected to a die or machine which includes a plurality of second outlet means 18, each comprising a fluid line 40, which is preferably fitted to the die or machine, and first orifice 30 built into a die or machine. Each of the valves $20a$ through $20n$ is connected the different fluid lines $40i$ of these second outlet means 18. The gauging system is then turned on, and when operator pushes the "ENTER" key to begin an operating program, the system loads the GAP program and reads the DATA.DAT file (180 in FIG. 4). The system then prompts the operator to "enter the out-of-spec limits", that is, to enter into the machine the measurement tolerances that are acceptable for the measurements to be taken. The system also prompts the operator to open the mold if it is not already open. When the out-of-spec limits have been entered, the GAP program calls for an assembly language procedure to collect data from the attached transducers $36a$ through $36n$ and 68, to average a designated number of readings, and to calculate the dimensionless parameters Ps/Pi from the averaged data. The GAP program then reads from the DATA.DAT file the maximum value of the Ps/Pi stored therein, which will correspond to the open mold measurement, calculates the actual measured value of Ps/Pi, and, if the reading is not within the spec limits for a particular transducer channel, outputs a red warning on the display 46 for that particular transducer channel, as shown in FIG. 5.

The GAP program can include instructions for generating and updating a display useful to the operator in analyzing the operation of the mold being monitored. The display generated by the calibration program may be any display that is easily interpreted by the system user. One such display is shown in FIG. 5. The display of FIG. 5 comprises a double headed arrow extending across a centerline, and defined by a wide border. When the adjustment is out-of-spec, the space within the arrow is red on one or the other side of the centerline to indicate the direction of adjustment to be made. When each valve $20i$ is adjusted to be within spec, the space within the arrow is green. In addition, the display may be provided with a numerical indication of the extent to which the adjustment is out-of-spec.

If the display indicates the red out-of-spec condition, the operator adjusts the valve $20i$ corresponding to each transducer $36i$ for which the out-of-spec pressure was measured until a green bar is output indicating that the system is calculating an "in spec" spacing for that channel. In the preferred embodiment, each adjustable valve $20i$ can be precisely adjusted by relative rotation of the first and second members (78 and 80). Because of their threaded interconnection and flow controlling surfaces, small adjustments in the flow controlling surfaces and small changes in flow can be effected by relatively large rotational movements, and the valves $20i$ are free of creep following their adjustment and maintain their settings.

The system is thus calibrated for each second outlet means 18 and its association length of fluid line $40i$. Thereafter in operation of the die or machine, whenever a spacing is changed, the system 16 calculates the measured value of Ps/Pi, finds the corresponding value of gap spacing, and reads out the corresponding value of gap spacing, which may be shown numerically and/or by a bar chart or in any of several other types of displays.

In an alternative calibration method, the installed gauging system 16 could be set to measure a particular gap, say 0.050 inches, and a calibrated gap of 0.050 inches could be magnetically attached to the surface of the die or mold over the orifice 30 of the channel that is to be calibrated. If a red "out-of-spec" signal is received, the valve would then be adjusted as set forth above until a green "in spec" signal is received.

As indicated at 184 in FIG. 4, the GAP program also is capable of responding to, measuring and displaying transient events occurring at the die casting machine, such as the gap spacing before and after a die shot is triggered. Other exemplary capabilities of the system are disclosed in PCT/US88/03561 which is hereby incorporated by reference.

The step-by-step programming of the calibration and operating programs using the information and description of the invention presented herein are believed to be within the ordinary skill of the computer program and are, therefore, not set forth in such language herein.

It is a feature of the invention that the method described above greatly facilitates calibration of the gauging system 16. The gauging system itself is calibrated at the factory, and only a single easy adjustment needs to be made for each installed sensor when the system is placed in use in the field. The invention thus not only permits a single adjustment to be made for the length of fluid line, but also eliminates the need to set precise gap spacings during the set up and calibration by the customer. The operator only needs to open the mold, watch the display, and adjust the valves 20i. This makes it quite easy for a customer with several die cast machines to use only one gauging system and take it from machine to machine. The fluid lines connected to the valves 20i may be equipped with quick disconnect fittings to enable the gauging system to be quickly moved from one machine to the next. The structure of the valve 20 as discussed above also contributes to the ease of adjustment. The valve 20 can be easily adjusted to high accuracy within the flow range that is appropriate for adjustments of the gauging system 16.

Another feature of the invention is that the accuracy of the gauging system 16 according to the invention is significantly higher than prior art gauging systems. The gauging system according to the invention has an accuracy of plus or minus 0.0001 inch, which is many times higher than prior systems. It is believed that this greatly increased accuracy is a result of the valve adjustment adjusting out other variations in the system, such as variations due to the particular first orifices and the electronics. While the variation due to any individual one of these other factors is much smaller than the variation due to fluid line length, in aggregate they may be significant.

There has been described a novel gauging system that greatly simplifies calibration and has many other advantages. It is evident that those skilled in the art may now make numerous uses and modifications of the specific embodiment described, without departing from the inventive concepts. For example, while the description is in terms of a particular adjustment means, i.e., the valve 20, other adjustment means, such as a system of slip-in orifices, may be used. A wide variety of electronic components may be substituted, and the various parts of the system may be made with a wide variety of dimensions and materials. Additional steps may be added to the method, and a wide variety of programs, displays, etc. may be used. Consequently, the invention is to be construed as embracing each and every novel feature and novel combination of features present in and/or possessed by the claimed method, apparatus and valve described.

What is claimed is:

1. A gauging system for providing a measurement of the distance of a surface from a first orifice through a range of distances, said system comprising:

a source of fluid under controlled pressure;

first outlet means for providing a first outlet for said fluid remote from said pressure source, said first outlet means comprising a first fluid line and said first orifice, said first fluid line connecting said pressure source and said first orifice;

a first transducer communicating with said first fluid line for monitoring the pressure in said first fluid line and for providing an output signal; and means for calculating from said output signal, the distance of said surface from said first orifice;

means for calibrating said system through the range of distances and providing a plurality of data points corresponding to discrete distances; and adjusting means for adjusting said system for different outlet means, whereby the calibration for the first outlet means can be accurately applied to a second outlet means having a second fluid line.

2. A gauging system as in claim 1, wherein said first fluid line has a first length, and said second fluid line has a second length different from said first length.

3. A gauging system as in claim 1 wherein said adjusting means comprises a fluid valve.

4. A gauging system as in claim 3 wherein said fluid valve is located between said transducer and said first orifice.

5. A gauging system as in claim 3 wherein said system further includes a second orifice located between said pressure source and said fluid line, and said fluid valve is located between said second orifice and said first orifice.

6. A gauging system for providing an indication of the distance of a surface from a first orifice, said system comprising:

a source of fluid under controlled pressure;

outlet means for providing an outlet for said fluid remote from said pressure source, said outlet means comprising a first fluid line and said first orifice, said first fluid line connecting said pressure source and said first orifice;

a transducer communicating with said first fluid line for monitoring the pressure in said first fluid line and for providing an output signal indicative of the distance of said surface from said first orifice;

means for calibrating said gauging system; and adjusting means for adjusting said system for different outlet means whereby the calibration for the first outlet means can be accurately applied to a second outlet means having a second fluid line, the adjusting means including a fluid valve comprising:

a first member having a first valve port and a channel communicating with said first valve port, said channel having a first channel portion with a wall having a first diameter, and a second channel portion having a wall with a second diameter larger than said first diameter thereby forming a shoulder between said first channel portion and second channel portion;

a second member receivable in said second channel portion of said channel and having a second valve port, a first surface means for sealingly engaging said shoulder, and a plurality of passages passing through said first surface means and communicating with said second valve port whereby fluid may flow from said first valve port to said second valve port;

sealing means for preventing fluid flow between said second member and said wall of said second channel portion of said first member; and third means for permitting controlled movement of said first surface means toward said shoulder and away from said shoulder to control fluid flow through said valve.

7. A gauging system as in claim 6 wherein said shoulder and said first surface means are in the form of a frustum of a cone.

8. A gauging system as in claim 6 wherein said third means comprises threads formed on said first and second members.

9. A gauging system as in claim 8 wherein said second member has a generally cylindrical outer surface, said channel is generally cylindrical and has a common cylindrical axis with said outer surface and said threads are formed on said wall of said channel and said outer surface of said second member.

10. A gauging system as in claim 6 wherein said first and second valve ports are generally cylindrical and are aligned along a common cylindrical axis.

11. A gauging system as in claim 6 and further including a stop means for engaging said first channel portion to prevent said first member from separating from said second member.

12. A gauging system as in claim 6, wherein said third means further includes drive means for driving said first surface means toward and away from said shoulder.

13. A gauging system as in claim 6 wherein said drive means comprises a computer controlled stepping motor.

14. A method of operating a gauging system, the gauging system including:
   a source of fluid under controlled pressure;
   a first outlet means for providing an outlet for said fluid remote from said pressure source, said first outlet means comprising a first fluid line and a first orifice, said first fluid line connecting said pressure source and said first orifice;
   a transducer communicating with said first fluid line for monitoring the pressure in said first fluid line and for providing an output signal indicative of the distance of a surface from said first orifice; and
   means for calibrating said gauging system over a range of distances of said surface from said first orifice whereby the calibration for said first outlet means can be accurately applied to a second outlet means having a second fluid line, the method comprising the steps of:
   providing an adjusting means for adjusting said system for different outlet means;
   calibrating said gauging system over said range of distances and providing a plurality of data points corresponding to discrete distances;
   detaching said first outlet means from the calibrated gauging means.
   replacing said first outlet means with said second outlet means; and
   adjusting said adjusting means until said gauging system is in calibration with said second outlet means.

15. The method of claim 14 wherein said step of replacing comprises attaching the second fluid line to the adjusting means, the second fluid line having a length that is different than the length of said first fluid line.

16. The method of claim 15 wherein said adjusting means comprises a fluid valve and said step of adjusting comprises adjusting said fluid valve.

17. The method of claim 14 wherein said first fluid line has a length equal to or greater than the length beyond which said transducer output is no longer affected by further increasing the length of said fluid line.

18. The method of claim 17 wherein said first fluid line has a length of 15 feet or greater.

19. A method of operating a gauging system, the system including:
   a source of fluid under controlled pressure;
   a first outlet means for providing an outlet for said fluid remote from said pressure source, said first outlet means comprising a first fluid line and a first orifice, said first fluid line connecting said pressure source and said first orifice;
   a transducer communicating with said first fluid line for monitoring the pressure in said first fluid line and for providing an output signal indicative of the distance of a surface from said first orifice; and
   means for calibrating said gauging system whereby the calibration for said first outlet means can be accurately applied to a second outlet means having a second fluid line, the method comprising the steps of:
   providing an adjusting means for adjusting said system for different outlet means;
   calibrating said gauging system;
   detaching said first outlet means from the calibrated gauging system;
   replacing said first outlet means with said second outlet means; and
   adjusting said adjusting means until said system is again in calibration, wherein said first fluid line has a length equal to or greater than the length beyond which said transducer output is no longer affected by further increasing the length of said fluid line and said adjusting means comprises a valve and said step of calibrating comprises setting said valve in the wide open position.

20. A method of operating a gauging system, the system including:
   a source of fluid under controlled pressure;
   a first outlet means for providing an outlet for said fluid remote from said pressure source, said first outlet means comprising a first fluid line and a first orifice, said first fluid line connecting said pressure source and said first orifice;
   a transducer communicating with said first fluid line for monitoring the pressure in said first fluid line and for providing an output signal indicative of the distance of a surface from said first orifice; and
   means for calibrating said gauging system whereby the calibration for said first outlet means can be accurately applied to a second outlet means having a second fluid line, the method comprising the steps of:
   providing an adjusting means for adjusting said system for different outlet means;
   calibrating said gauging system;
   detaching said first outlet means from the calibrated gauging system;
   replacing said first outlet means with said second outlet means; and
   adjusting said adjusting means until said system is again in calibration, said adjusting means comprising a valve and said step of calibrating comprising setting said valve in the wide open position.

21. A method of operating a gauging system, the system including:
   a source of fluid under controlled pressure;
   a first outlet means for providing an outlet for said fluid remote from said pressure source, said first outlet means comprising a first fluid line and a first orifice, said first fluid line connecting said pressure source and said first orifice;
   a transducer communicating with said first fluid line for monitoring the pressure in said first fluid line and for providing an output signal indicative of the distance of a surface from said first orifice; and
   means for calibrating said gauging system whereby the calibration for said first outlet means can be accurately applied to a second outlet means having a second fluid line and a second orifice, the method comprising the steps of:

providing an adjusting means for adjusting said system for different outlet means;

calibrating said gauging system;

detaching said first outlet means from the calibrated gauging system;

replacing said first outlet means with said second outlet means to form a second system; and adjusting said adjusting means until said second system is in calibration, wherein said step of replacing comprises attaching the second fluid line to the adjusting means, the second fluid line having a length that is different than the length of said first fluid line, and said step of calibrating includes the steps of placing said calibrating surface at a distance that is at least as far from said first orifice of said first outlet means as the distance at which said system indicates an essentially open space in front of said first orifice and measuring the output of said transducer, and said step of adjusting comprises locating and adjustment surface at a location that is at least as far from the second orifice of said second outlet means as the distance at which said system should indicate an essentially open space in front of the first orifice and adjusting said valve until said transducer output is within a predetermined range including the output measured when said calibrating surface was placed so that said first orifice of said first output means was essentially open.

22. A method of operating a gauging system, the gauging system including:

a source of fluid under controlled pressure;

a first outlet means for providing an outlet for said fluid remote from said pressure source, said first outlet means comprising a first fluid line and a first orifice, said first fluid line connecting said pressure source and said first orifice;

a transducer communicating with said first fluid line for monitoring the pressure in said first fluid line and for providing an output signal indicative of the distance of a surface from said first orifice; and means for calibrating said gauging system over a range of distances of said surface from said first orifice whereby the calibration for said first outlet means can be accurately applied to a second outlet means having a second fluid line, the method comprising the steps of:

providing a fluid valve for adjusting said gauging system for different outlet means;

calibrating said gauging system over said range of distances and providing a plurality of data points corresponding to discrete distances, said step of calibrating comprising the steps of placing a calibrating surface at a plurality of discrete distances from said first orifice of said first outlet means and monitoring the output of said transducer for each of said plurality of discrete distances, detaching said first outlet means from the calibrated gauging system;

replacing said first outlet means with a second outlet means comprising a second fluid line and a second orifice by connecting the second fluid line with the fluid valve, the second fluid line having a length that may be different than the length of said first fluid line; and adjusting said fluid valve means until said gauging system is in calibration with said second outlet means attached thereto.

said step of adjusting comprising locating a calibration surface a distance from said second orifice of the second outlet means equal to one of said discrete distances, and adjusting said fluid valve until said transducer output is within a predetermined range including the output measured for said one of said discrete distances during said step of calibrating.

23. The method of claim 22 and further including the step of selecting said predetermined range.

* * * * *